United States Patent [19]
Iida et al.

[11] Patent Number: 6,154,425
[45] Date of Patent: Nov. 28, 2000

[54] DRIVING APPARATUS OF AN OPTICAL RECORDING MEDIUM

[75] Inventors: Michihiko Iida; Kunihiko Miyake, both of Kanagawa, Japan

[73] Assignee: Sony Corporation, Tokyo, Japan

[21] Appl. No.: 09/173,364

[22] Filed: Oct. 15, 1998

[30] Foreign Application Priority Data

Oct. 17, 1997 [JP] Japan .................................. 9-285066

[51] Int. Cl.⁷ ........................................................ G11B 7/09
[52] U.S. Cl. .................................. 369/44.29; 369/44.25; 369/44.35; 250/201.5
[58] Field of Search .......................... 369/44.25, 44.27, 369/44.28, 44.29, 44.32, 44.35, 112, 54; 250/201.5

[56] References Cited

U.S. PATENT DOCUMENTS

| | | | |
|---|---|---|---|
| 5,073,881 | 12/1991 | Akiyama | 369/44.25 X |
| 5,287,339 | 2/1994 | Watanabe | 369/44.25 |
| 5,363,357 | 11/1994 | Niwayama | 369/44.27 |

*Primary Examiner*—Muhammad Edun
*Attorney, Agent, or Firm*—Limbach & Limbach L.L.P.

[57] ABSTRACT

A low-speed focus servo operation in which an objective lens is moved slowly is performed in a start process that is executed after mounting of an optical recording medium. On the other hand, a high-speed focus search operation in which the objective lens is moved fast is started when focusing is lost in a state that a focus servo operation is being performed. In the high-speed focus search operation, the focus servo characteristic is set to a modified version of a characteristic that is determined by a calibration operation that is performed in the start process.

4 Claims, 7 Drawing Sheets

FIG.2A
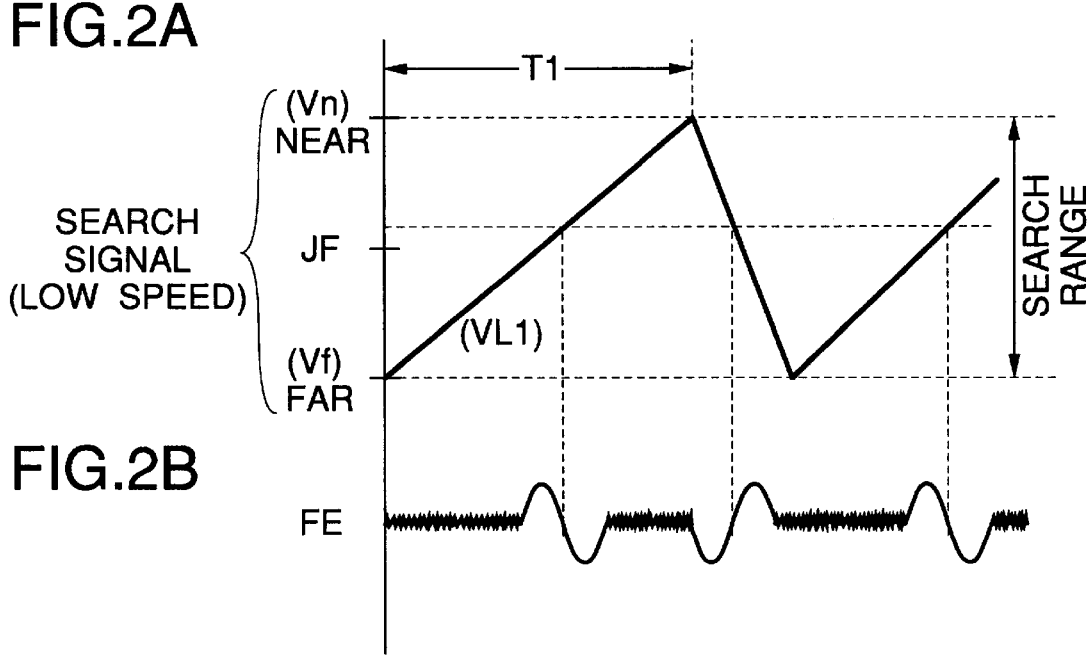
FIG.2B
FIG.2C
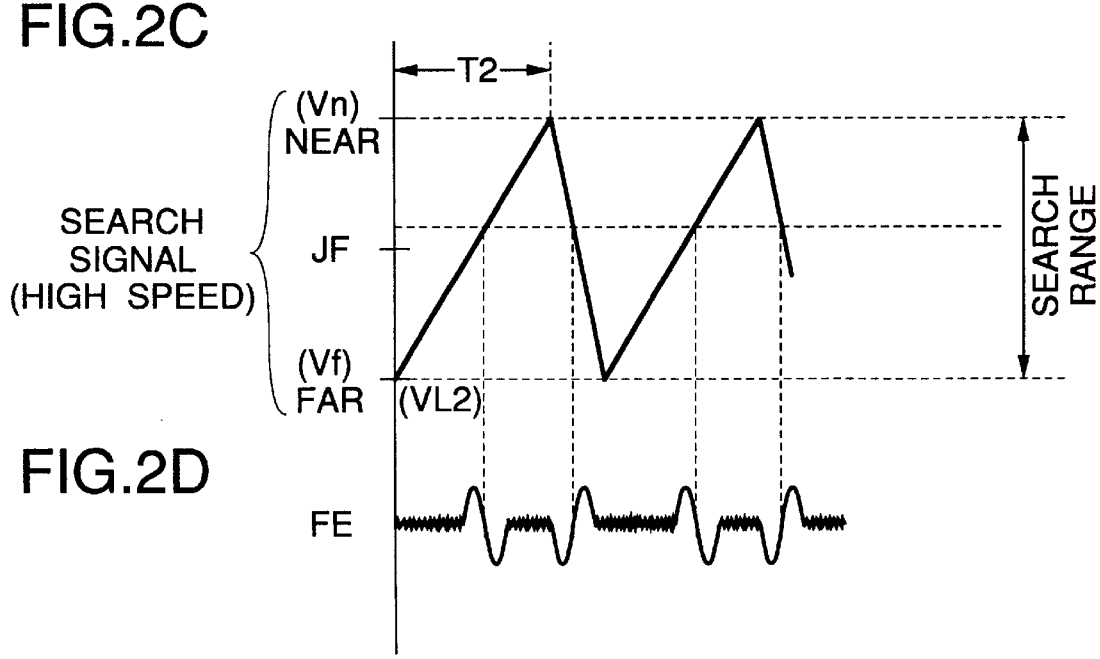
FIG.2D

FIG.5A
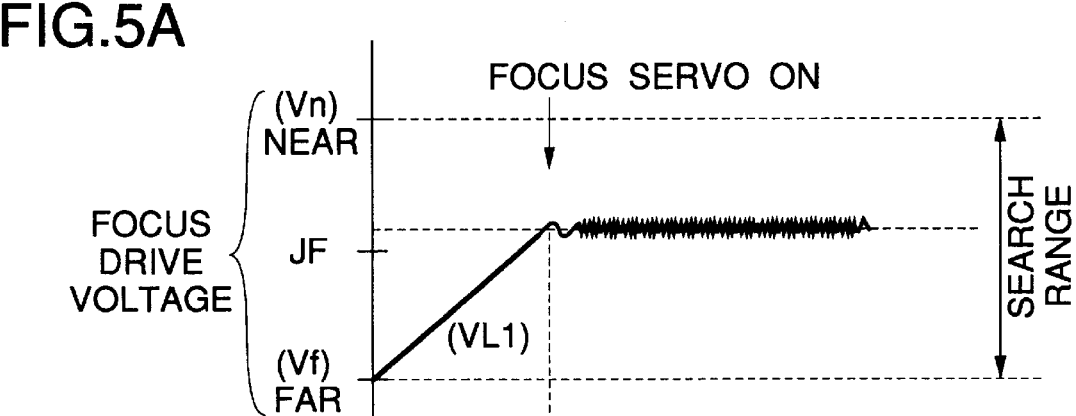
FIG.5B
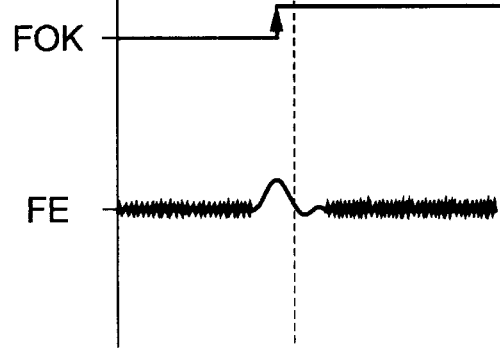
FIG.5C

FIG.6A
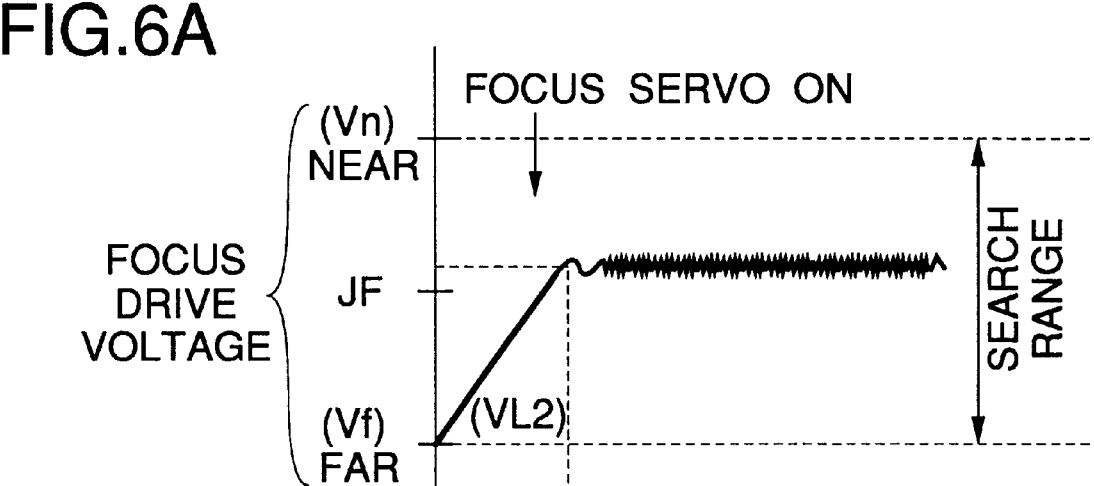
FIG.6B
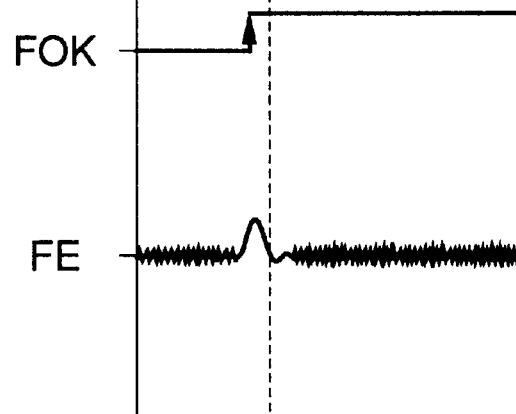
FIG.6C

DRIVING APPARATUS OF AN OPTICAL RECORDING MEDIUM

BACKGROUND OF THE INVENTION

The present invention relates to a driving apparatus which can perform a reproducing and/or recording operation in accordance with an optical recording medium.

CD (compact disc)-type discs, a DVD (digital versatile disc/digital video disc) that is suitable for multimedia purposes, and other kinds of discs have been developed as optical disc recording media.

In driving apparatuses for those kinds of optical discs, data is read out by applying laser light to a disc and detecting resulting reflection light.

For the above readout operation to be performed satisfactorily, it is required that laser Light be in a focused state at the position of the disc recording surface. For such a focusing state control, a focus servo circuit is provided which keeps laser light focused on the disc recording surface by moving an objective lens (which is a laser light output end) in the direction in which it comes closer to or goes away from the disc in accordance with a focus error signal that is produced according to an astigmatism scheme, for example.

To allow the focus servo circuit to effect focus pull-in satisfactorily, it is necessary to detect a portion of a movable range of the objective lens where a good focus error signal (what is called an S-shaped curve) is obtained. Therefore, in a start process that is executed upon disc insertion or in re-establishing a focused state when focusing is lost during a playback or a seek operation, first an operation called "focus search" is performed to detect a focus pull-in range. The focus search is an operation for determining a range (focus pull-in possible range) where an S-shaped curve can be obtained in a focus error signal as the objective lens is moved, for example, from a position that is most distant from the disc to a position that is closest to the disc (i.e., over an objective lens movable ranged as a focus stroke) in a state that a focus servo loop is opened.

By closing the focus servo loop in a state that the objective lens is located in the focus pull-in range, the position of the objective lens can be led to a focusing position that corresponds to the zero-cross point of the S-shaped curve in a focus error signal.

It is preferable that a focus search operation be completed as quickly as possible. One method for satisfying this requirement would be to move the objective lens fast in the focus stroke.

However, moving the objective lens too fast increases a possibility that a focus pull-in attempt fails when a focus servo operation is turned on after a focus pull-in possible range has been detected.

On the other hand, if focusing is lost, for example, during a disc playback (e.g., during a seek operation) that is performed by the disc driving apparatus in response to a read instruction that is sent from a host computer, a focus search operation that lasts too long may cause the host computer to execute an error process with a judgment that a time-out has occurred. A focus search operation that takes long time is not preferable because it delays a transfer of reproduced data to a computer so much, even if a time-out does not occur.

However, it is difficult to increase the speed of the focus search operation is because simply increasing the speed of the focus search operation increases the possibility of a focus pull-in failure as described above.

SUMMARY OF THE INVENTION

The present invention has been made in view of the above problems in the art, and an object of the invention is therefore to realize a high-performance driving apparatus by enabling the focus search speed to be switched in accordance with a situation.

To attain the above object, the invention provides a driving apparatus which performs a recording and/or reproducing operation on an optical recording medium by applying laser light to the optical recording medium via an objective lens while controlling a position of the objective lens so as to focus the laser light on a recording surface of the optical recording medium, comprising focusing means for performing a focus search operation for detecting a focus pull-in range by forcibly moving the objective lens, and for performing a focus servo operation for controlling the position of the objective lens so that it is pulled into a focusing position by closing a servo loop in state the objective lens is located in the focus pull-in range; and control means for causing the focusing means to perform a first focus search operation in which the objective lens is moved at a first speed in a start process that is executed after mounting of the optical recording medium, and a second focus search operation in which the objective lens is moved at a second speed that is higher than the first speed when focusing is lost in a state that the focus servo operation is being performed.

The control means may be configured so as to set a focus servo characteristic to a preset characteristic in causing the focusing means to perform the first focus search operation, and causes the focusing means to perform an operation of calibrating the focus servo characteristic after completion of the first focus search operation; and as to set the focus servo characteristic to a characteristic that is determined based on the calibrated characteristic in causing the focusing means to perform the second focus search operation.

In a start process that is executed after mounting of an optical recording medium, a focus search operation need not be performed quickly because, for example, a playback is not started immediately. Therefore, the objective lens is moved slowly to surely attain focus pull-in even if the servo characteristic is not the optimum one. On the other hand, when focusing is lost during a seek operation or a playback, a focus search operation needs to be completed quickly. Therefore, the objective lens is moved fast. In this case, the servo characteristic is set to a characteristic that is determined based on a calibrated characteristic, whereby focus pull-in can surely be attained even in a high-speed focus search operation.

BRIEF DESCRIPTION OF THE DRAWINGS

FIGS. 2A–2D are waveform diagrams showing a focus search operation according to the embodiment;

FIGS. 5A–5C are waveform diagrams showing a low-speed focus search operation according to the embodiment;

FIGS. 6A–6C are waveform diagrams showing a high-speed focus search operation according to the embodiment.

DETAILED DESCRIPTION OF THE PREFERRED EMBODIMENT

A disc driving apparatus (reproducing apparatus) for handling an optical disc as a recording medium will be hereinafter described as an embodiment of the present invention.

Examples of optical discs that are mounted in this disc driving apparatus are a DVD and CD-type discs such as a CD-DA (compact disc-digital audio) and a CD-ROM. It goes without saying that the invention can also be applied to disc driving apparatuses for other kinds of optical discs.

Figure 1:
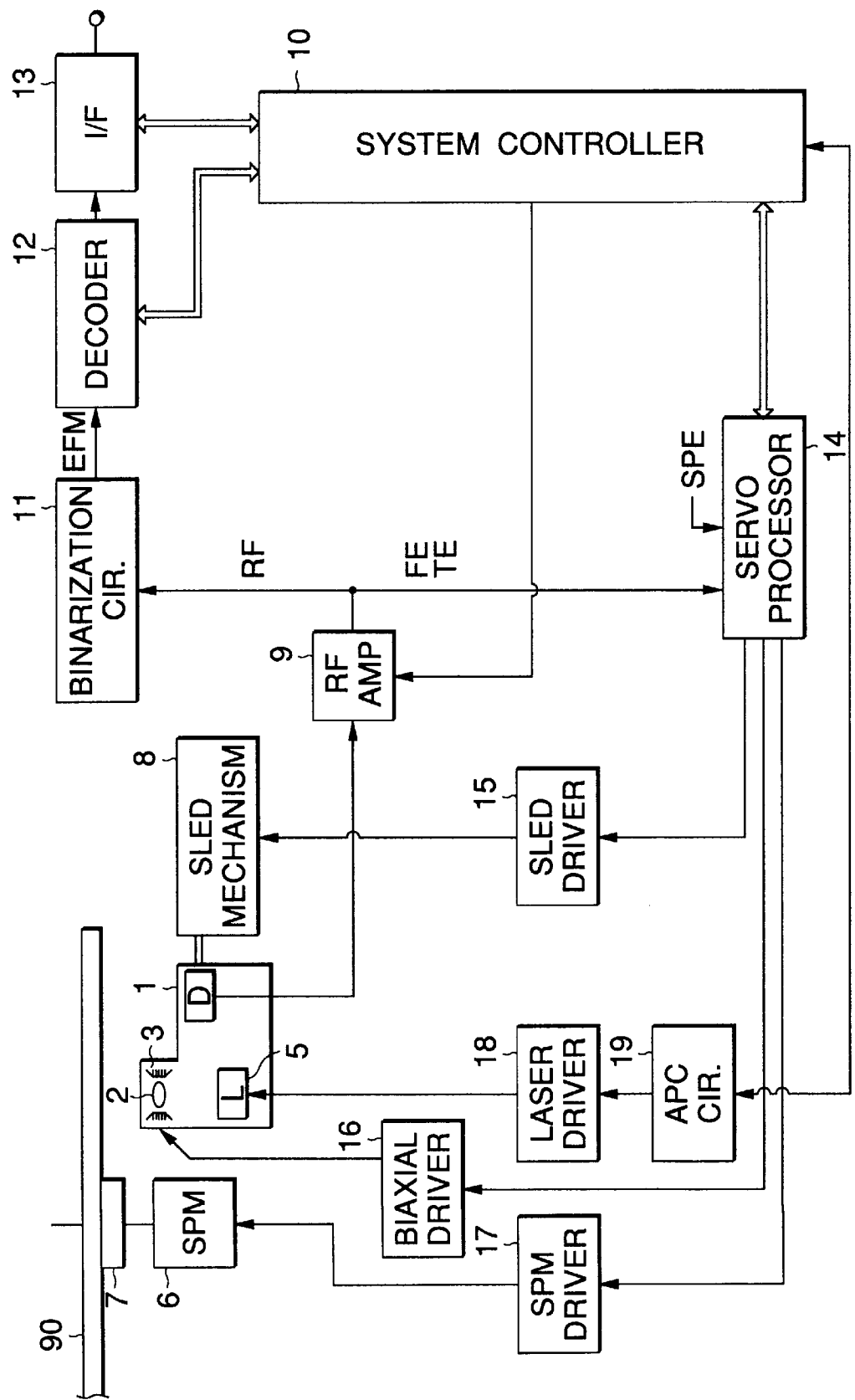
FIG. 1 is a block diagram of a disc driving apparatus according to an embodiment of the present invention.

FIG. 1 is a block diagram of the main part of a disc driving apparatus according to the embodiment.

A disc 90 is mounted on a turn table 7 and rotated by a spindle motor 6 at a constant linear velocity (CLV) or a constant angular velocity (LAV) during a playback. Data that is recorded on the w disk 90 in the form of embossed pits or phase-change pits is read out by a pickup 1.

The pickup 1 incorporates a laser diode 4 as a laser light source, a photodetector 5 for detecting reflection light, an objective lens 2 as a laser light output end, and an optical system for applying laser light to the disc recording surface via an objective lens 2 and guiding resulting reflection light to the photodetector 5. The objective lens 2 is held by a biaxial mechanism 3 so as to be movable in both of the tracking direction and the focusing direction. The entire pickup 1 is held by a sled mechanism 8 so as to be movable in the disc radial direction.

Information of reflection light coming from the disc 90 is detected by the photodetector 5 and thereby converted into electrical signals that reflect detected light quantities. The electrical signals are supplied to an RF amplifier 9.

The RF amplifier 9 has a current-to-voltage conversion circuit, a matrix operation/amplification circuit, and other circuits to deal with output currents of a plurality of photo-detecting elements of the photodetector 5. The RF amplifier 9 generates, through a matrix operation, necessary signals such as an RF signal as reproduction data and a focus error signal FE and a tracking error signal TE for servo controls.

The reproduction RF signal that is output from the RF amplifier 9 is supplied to a binarization circuit 11, and the focus error signal FE and the tracking error signal TE are supplied to a servo processor 14.

The reproduction RF signal that has been obtained by the RF amplifier 9 is binarized by the binarization circuit 11 and is thereby converted into what is called an EFM (8-14 modulation signal; in the case of a CD) or an EFM+ signal (8-16 modulation signal; in the case of a DVD), which is supplied to a decoder 12. The decoder 12 reproduces the information that has been read out from the disc 90 by performing EFM demodulation, CIRC decoding, etc. and, if necessary, CD-ROM decoding, MPEG decoding, or the like.

Reproduced data is output to an external apparatus such as a host computer via an interface section 13.

The servo processor 14 causes servo operations by generating focus, tracking, sled, spindle servo drive signals based on the focus error signal FE and the tracking error signal TE that are supplied from the RF amplifier 9 and a spindle error signal SPE that is supplied from the decoder 12 or a system controller 10, and other signals.

Specifically, the servo processor 14 generates a focus drive signal and a tracking drive signal in accordance with the focus error signal FE and the tracking error signal TE and supplies those signals to a biaxial driver 16. The biaxial driver 16 drives a focusing coil and a tracking coil of the biaxial mechanism 3 of the pickup 1. In this manner, a tracking servo loop and a focus servo loop are formed by the pickup 1, the RF amplifier 9, the servo processor 14, the biaxial driver 16, and the biaxial mechanism 3.

Further, the servo processor 14 supplies a spindle motor driver 17 with a spindle drive signal that is generated in accordance with the spindle error signal SPE. The spindle motor driver 17 applies, for example, 3-phase drive signals to the spindle motor 6 in accordance with the spindle drive signal and thereby causes a CLV rotation of the spirdle motor 6. Further, the servo processor 14 generates a spindle drive signal in accordance with a spindle kick/brake control signal that is supplied from the system controller 10, and thereby causes the spindle motor driver 17 to activate or stop the spindle motor 6.

The servo processor 14 generates a sled drive signal based on, for example, a sled error signal that is obtained as a low-frequency component of the tracking error signal TE or an access (seek) execution control signal that is supplied from the system controller 10, and supplies the generated sled error signal to the sled driver 15. The sled driver 15 drives the sled mechanism 8 based on the sled drive signal. Having a mechanism (not shown) consisting of a main shaft for holding the pickup 1, a sled motor, transmission gears, and other parts, the sled mechanism 8 causes a necessary slide movement of the pickup 1 as the sled driver 15 drives the sled motor in accordance with the sled drive signal.

The laser diode 4 of the pickup 1 is driven by a laser driver 18 so as to emit laser light. The system controller 10 sets a laser power control value in an automatic power control circuit 19 in playing back the disc 90. The automatic power control circuit 19 controls the laser driver 18 so that laser light is output in accordance with the thus-set laser power value.

To make the apparatus also capable of a recording operation, it is adapted in such a manner that a signal that is modulated in accordance with recording data is supplied to the laser driver 18.

For example, when recording is performed on a record-able disc 90, recording data that is supplied to the interface section 13 from a host computer or the like is then subjected to addition of error correcting codes, EFM+ modulation, and other processes in an encoder. Resulting recording data is supplied to the laser driver 18. The laser driver 18 causes the laser diode 4 to emit laser light in accordance with the recording data, whereby the data is recorded on the disc 90.

The above-described operations such as the servo operations, the decoding, and the encoding are controlled by the system controller 10 that is implemented by a microcomputer. For example, such operations as a start and a termination of a playback, a track access, a fast-feed playback, and a fast-return playback are realized by the system controller 10 through control of the servo processor 14 and the pickup 1.

Now, a description will be made of the focus search operation in the above disc driving apparatus.

In a focus servo operation, the objective lens 2 that is supported by the biaxial mechanism 3 in the pickup 1 is moved in the direction in which it comes closer to Dr goes away from the disc 90 so that laser light is focused on the signal surface of the disc 90.

To perform a focus servo control, first a focus pull-in range is detected by forcibly moving the objective lens 2 within its focus stroke. That is, a focus search operation is performed in which an S-shaped curve in a focus error signal FE is detected and a focus pull-in range that is a linear portion of the S-shaped curve is found. A focus servo control for making convergence to a just-focused state is thereafter performed by closing the focus servo loop in a state that the objective lens 2 is located in the focus pull-in range.

The focus search operation is performed at the time of starting, that is, after mounting of the disc 90 as well as in effecting focus pull-in again when a focus servo operation is disabled during a disc playback, a seek operation, or the like.

In the focus search operation, the servo processor 14 opens the focus servo loop and then generates a search voltage for forcibly moving the objective lens 2 and supplies it to the biaxial driver 16 so that it is applied to the focusing coil.

FIG. 2A shows an example of the search voltage. For the focus search operation, for example, the search voltage is generated so as to vary linearly from a voltage value Vf to Vn so that the objective lens 2 is moved from a position most distant from the disc 90 to a position closest to the disc 90 within its movable range (i.e., search range). In FIG. 2A, the vertical axis represents the search voltage value and the corresponding position of the objective lens 2 and the horizontal axis represents the time.

As the objective lens 2 is moved in the above manner, an S-shaped curve is obtained in a focus error signal FE in the vicinity of a focusing position. For example, with an assumption that position JF (a position of the objective lens 2 corresponding to a certain search voltage value) shown in FIG. 2A is a focusing position, an S-shaped curve is obtained in a focus error signal FE in the vicinity of the focusing position JF as shown in FIG. 2B.

A positional range corresponding to the linear portion of the S-shaped curve is the focus pull-in possible range. That is, if a focus servo operation is turned on at a time point when the objective lens 2 is within the focus pull-in possible range, the focus servo operation controls the objective lens 2 so that it is moved to the focusing position JF that corresponds to the zero-cross point of the S-shaped curve.

In the example of FIG. 2A, the search voltage is a signal that causes the objective lens 2 to move from the position most distant from the disc 90 to the position closest to the disc 90 in a period T1. A speed of the movement of the objective lens 2 in the period T1 that is caused by the above search voltage is denoted by VL1.

In this embodiment, in addition to the focus search operation at the movement speed VL1, another type of focus search operation with a faster search movement is made possible.

FIG. 2C shows a search voltage for the high-speed focus search operation. While this focus search operation is the same as the above one in that the search voltage varies linearly from the voltage value Vf to Vn, this focus search operation is performed in a period T2 that is shorter than the above-mentioned period T1. That is, an object lens movement speed VL2 of this case is higher than the above-mentioned movement speed VL1.

As the objective lens 2 is moved in this manner, an S-shaped curve is obtained in a focus error signal FE in the vicinity of the focusing position JF as shown in FIG. 2D.

As described above, in this embodiment, the low-speed focus search operation shown in FIG. 2A and the high-speed focus search operation as shown in FIG. 2C can be performed. While the low-speed focus search operation is performed in a start process that is executed after mounting of the disc 90, the high-speed focus search operation is performed in effecting focus pull-in again (i.e., in a retry process) when a focus servo operation is disabled during a disc playback, a seek operation, or the like.

The objective lens movement speed VL2 of the high-speed focus search operation may be set two to four times higher than the objective lens movement speed VL1 of the low-speed focus search operation.

Processes that are executed in a start process and a retry process will be described below with reference to FIGS. 3 and 4, respectively.

Figure 3:
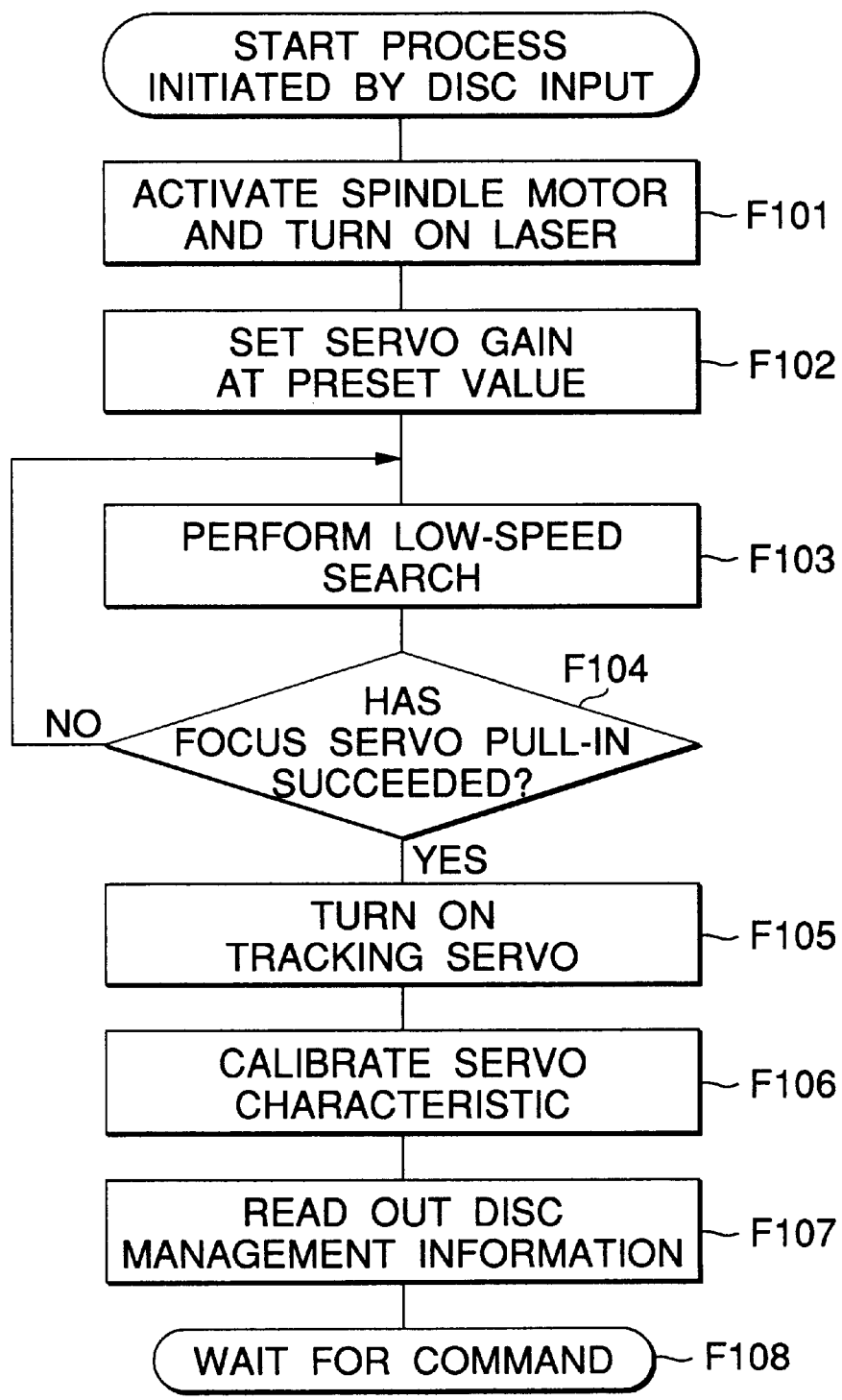
FIG. 3 is a flowchart showing a start process according to the embodiment.

FIG. 3 shows a start process that is executed by the system controller 10 after the disc 90 is mounted.

Upon mounting of the disc 90, the system controller 10 starts to execute the process from step F101. At step F101, the system controller 10 causes the laser diode 4 to start emitting laser light at a read power and activates the spindle motor 6.

Then, at step F102, the system controller 10 sets the servo gain to a particular preset curve. For example, the system controller 10 sets a gain characteristic that is applied to a focus error signal FE in the RF amplifier 9. Since the optimum characteristic for the disc 90 mounted is unknown at this time point, the particular preset curve is a characteristic that facilitates focus pull-in to some extent irrespective of variations in the characteristics of the disc 90 and the rotation speed. For example, such a characteristic is obtained by setting the servo gain somewhat lower than a gain during a playback or by further boosting a low-frequency portion. For example, the frequency characteristic of an equalizer (phase compensation circuit) to characteristic ① shown in FIG. 7.

After the setting of the servo gain, the system controller 10 performs a low-speed focus search operation at step F103. That is, the system controller 10 performs a focus search operation in which a search voltage having a triangular waveform with a relatively gentle slope (see FIG. 2A) is generated and the objective lens 2 is moved at the speed VL1.

FIGS. 5A–5C show this low-speed focus search operation. As a search voltage is generated so as to move the objective lens 2 closer to the disc 90 starting from a position most distant from the disc 90 as shown in FIG. 5A, an S-shaped curve in the focus error signal FE is monitored as shown in FIG. 5C. For example, the position of the S-shaped curve can be recognized by an FOK signal as shown in FIG. 5B. The FOK signal reflects a result of a comparison between an addition signal of reflection light and a predetermined threshold level, and hence indicates an S-shaped curve portion of the focus error signal FE.

When an S-shaped curve portion, that is, a focus pull-in possible range, has been detected, the system controller 10 instructs the servo processor 14 to start a focus servo operation. In response, a focus servo control for causing the position of the objective lens 2 to converge to the focusing position JF as shown in FIG. 5A is performed.

When focus pull-in has been attained, the process goes from step F104 to step F105, where a tracking servo operation is turned on to establish a data readable state. Then, at step F106, the system controller 10 causes the servo processor 14 to calibrate the servo characteristic. Specifically, a sinusoidal signal having a fixed frequency is applied to the focus servo loop as a disturbance signal as the servo gain characteristic is varied, and a degree of attenuation of the disturbance signal in the loop is detected. The system controller 10 holds, as the optimum servo gain characteristic for the disc 90 being mounted, a servo gain characteristic at a time point when the amplitude of the attenuated disturbance signal falls within a preset range. The system controller 10 sets, in the RF amplifier 9 or the servo processor 14, the servo gain characteristic of the focus error signal FE to the above calibration curve. For example, the calibration operation causes the servo gain characteristic to be changed from characteristic ① to characteristic ② (see FIG. 7). It is seen from FIG. 7 that the gain is increased from the initial preset curve over the entire frequency range up to 3 kHz.

After the execution of the above processes, at step F107 the system controller 10 causes readout of management information (e.g., TOC and file manager information) that is recorded on the disc 90. Then, at step F108, the system controller 10 establishes a state of waiting for arrival of a command from a host computer.

At a certain time point, a read commend is sent from the host computer to the system controller 10 via the interface section 13. For example, the read command includes a command as a read instruction itself, an address on which to perform a read operation, and length data indicating the length of data to be read out from that address.

Figure 4:
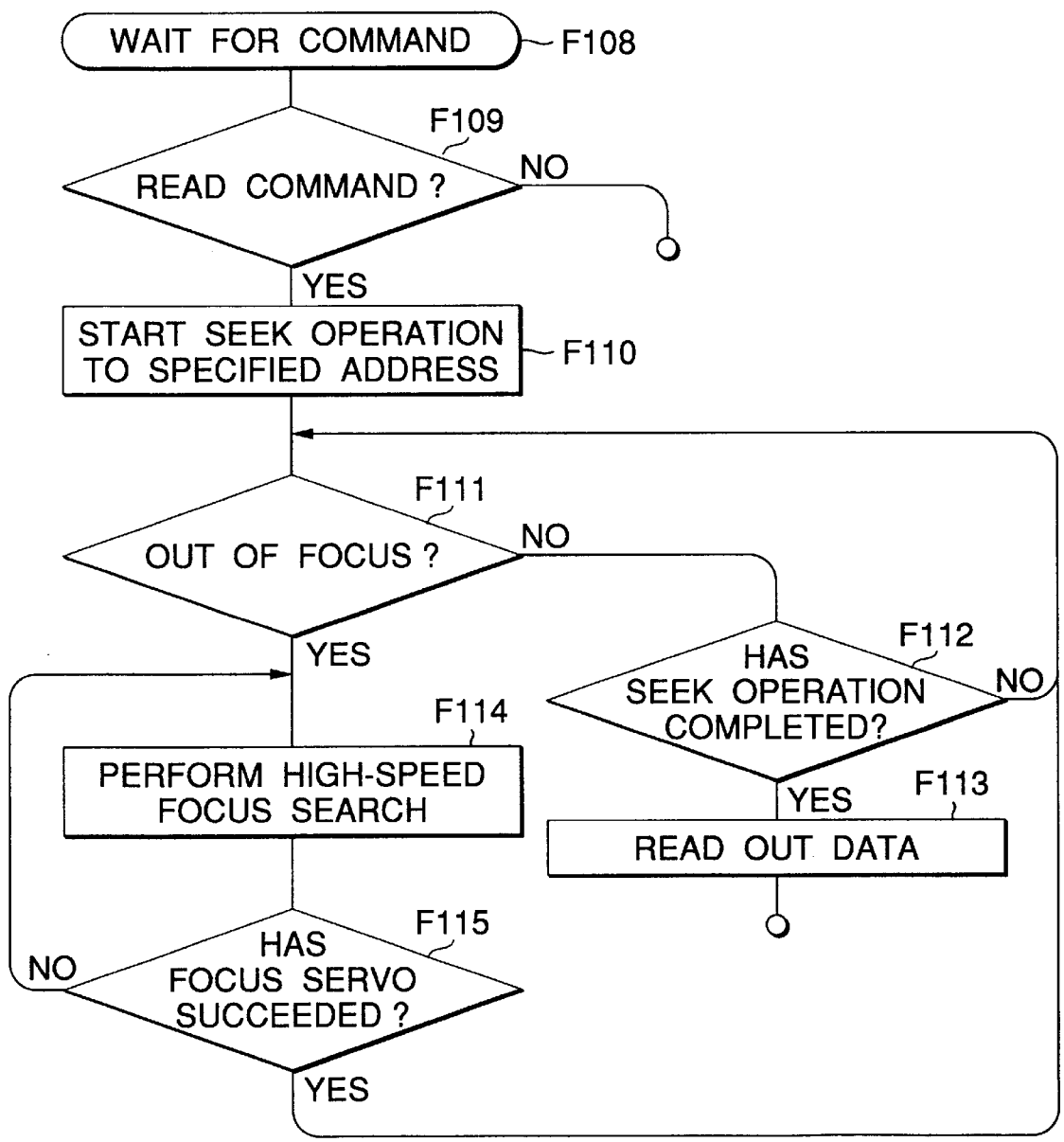
FIG. 4 is a flowchart showing a process according to the embodiment that is executed when a read command is generated.

When such a read command is transmitted in the command waiting state (step F108), the process of the system controller 10 goes from step F109 to step F110 (see FIG. 4). At step F110, to reproduce required data, the system controller 10 starts a seek operation to move the pickup 1 to a specified address.

The focus servo operation is kept on during the seek operation. However, there frequently occurs an event that a focus servo operation is disabled during a seek movement.

If it is detected that focusing is lost from, for example, a fall of the FOK signal, the process goes from step F111 to F114, where a focus search operation is performed.

At this time, a high-speed search is performed; that is, the system controller 10 performs a focus search operation in which a search voltage having a triangular waveform with a steeper slope (see FIG. 2C) than the search voltage used in the start process is generated and the objective lens 2 is moved at the speed VL2.

FIGS. 6A–6C show this high-speed focus servo operation. As a search voltage is generated so as to move the objective lens 2 closer to the disc 9 starting from a position most distant from the disc 90 as shown in FIG. 6A, an S-shaped curve in the focus error signal FE is detected as shown in FIG. 6C by, for example, monitoring the FOK signal as shown in FIG. 6B. When an S-shaped curve portion, that is, a focus pull-in possible range, has been detected, the system controller 10 instructs the servo processor 14 to start a focus servo operation. In response, a focus servo control for causing the position of the objective lens 2 to converge to the focusing position JF as shown in FIG. 6A is performed.

Figure 7:
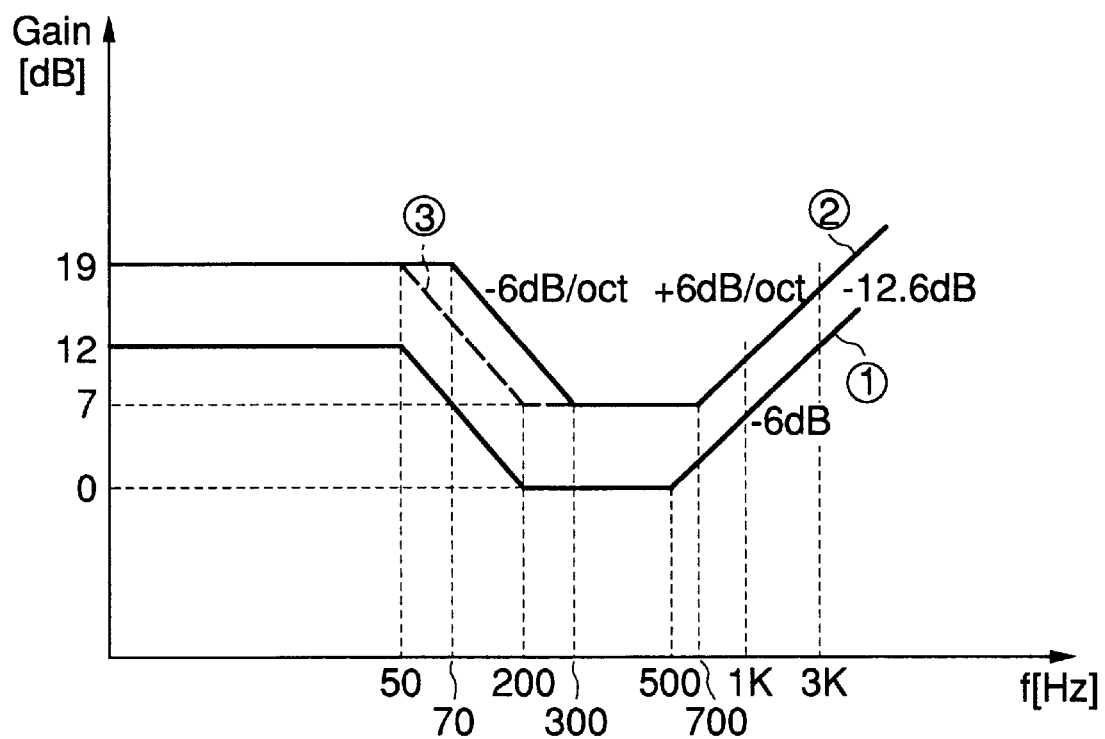
FIG. 7 is a graph showing a servo gain calibration operation according to the embodiment.

During this focus search operation, the servo gain characteristic is set to characteristic ③ shown in FIG. 7 in which a low-frequency portion (50–300 Hz) is lowered. This is to cope with a variation of the position on which to make focusing due to surface deflection of the disc 90.

When focus pull-in has been attained, the process returns from step F115 to the loop of steps F111 and F112. When a seek operation to reach the target address has completed, the process goes from step F112 to step F113, where data is read out from the disc 90. Read out data is transferred to the host computer via the interface section 13.

Focusing may be lost not only during a seek operation but also during a data read operation because of disturbance such as vibration, a scratch on the disc 90, or some other cause. A high-speed focus search operation maybe performed in such a case.

Even during a data read operation or the like, a low-speed focus search operation may be employed if quickness is not required depending on the circumstances, the type of system operation, and other factors.

As described above, according to the embodiment, the low-speed focus search operation is performed in a start process that is executed after mounting of a disc. In this case, since the optimum characteristic for the disc mounted is unknown, the servo gain characteristic is set to a preset characteristic. However, since the objective lens is moved slowly in this search operation, the probability that focus pull-in is attained can be made high. That is, in this case, in consideration of an ample margin in time, a focus search operation is performed at low-speed to surely attain focus pull-in.

On the other hand, the high-speed focus search operation is performed during a seek operation or a playback, because in such a period the focus search is required to be performed as quickly as possible to avoid a data transfer delay or a judgment of a host computer that a time-out has occurred during a data read operation. In this case, since the servo gain characteristic is set to a calibrated characteristic, the probability that focus pull-in is attained is very high even with a fast movement of the objective lens. As a result, a quick focus search operation is realized.

In other words, it is preferable to set the objective lens movement speed VL2 of the high-speed search operation in such a manner that a speed at which pull-in is attained almost certainly with a servo gain characteristic that is calibrated to the optimum state is made the upper limit.

What is claimed is:

1. A driving apparatus which performs a recording and/or reproducing operation on an optical recording medium by applying laser light to the optical recording medium via an objective lens while controlling a position of the objective lens so as to focus the laser light on a recording surface of the optical recording medium, comprising:

focusing means for performing a focus search operation for detecting a focus pull-in range by forcibly moving the objective lens, and for performing a focus servo operation for controlling the position of the objective lens so that it is pulled into a focusing position by closing a servo loop in a. state the objective lens is located in the focus pull-in range; and control means for causing the focusing means to perform a first focus search operation in which the objective lens is moved at a first speed in a start process that is executed after mounting of the optical recording medium, and a second focus search operation in which the objective lens is moved at a second speed that is higher than the first speed when focusing is lost in a state that the focus servo operation is being performed.

2. The driving apparatus according to claim 1, wherein the control means sets a focus servo characteristic to a preset characteristic in causing the focusing means to perform the first focus search operation, and causes the focusing means to perform an operation of calibrating the focus servo characteristic after completion of the first focus search operation; and wherein the control means sets the focus servo characteristic to a characteristic that is determined based on the calibrated characteristic in causing the focusing means to perform the second focus search operation.

3. The driving apparatus according to claim 1, wherein the focusing means outputs a first triangular wave signal having a first slope in performing the first focus search operation, and outputs a second triangular wave signal having a second slope that is steeper than the first slope in performing the second focus search operation.

4. The driving apparatus according to claim 1, wherein the control means sets a focus servo characteristic to a first, preset characteristic in causing the focusing means to perform the first focus search operation; and wherein the control means changes the focus servo characteristic to a second characteristic that is determined based on a characteristic that has larger gain values than the first characteristic and has been determined by a calibration operation that has been performed after completion of the first focus search operation, in causing the focusing means to perform the second focus search operation.

* * * * *